Oct. 21, 1924.  
A. GRIEVES  
1,512,532  
TYING MECHANISM FOR BALING PRESSES  
Filed July 23, 1920   9 Sheets-Sheet 4
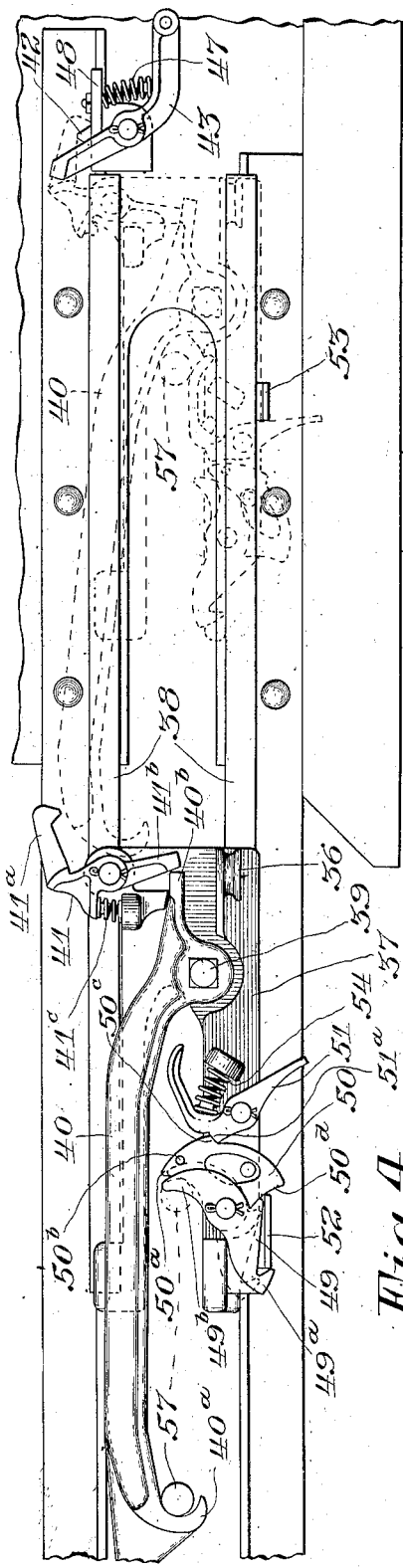
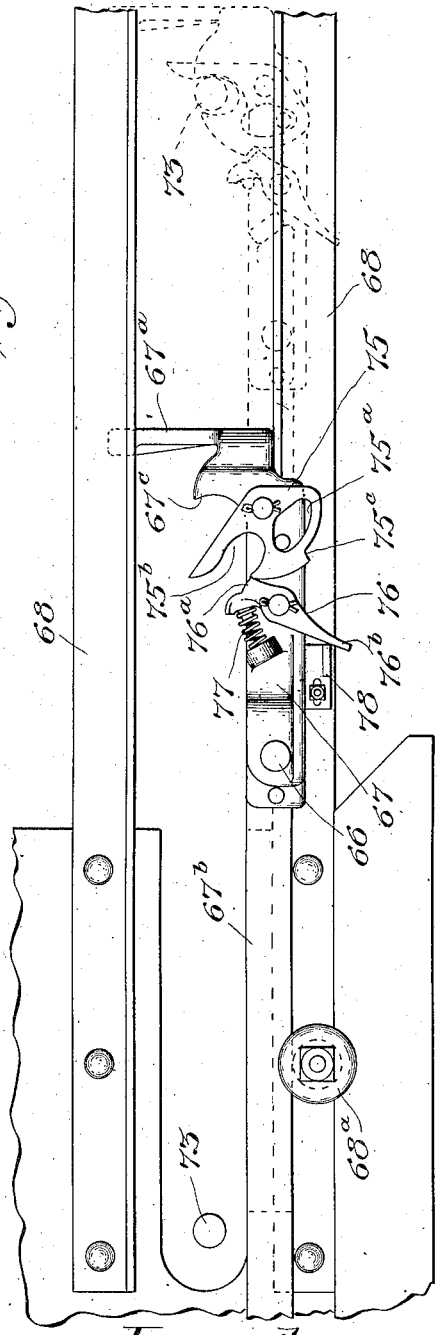
Inventor.  
Albert Grieves,  
By H.P. Doolittle  
Atty.

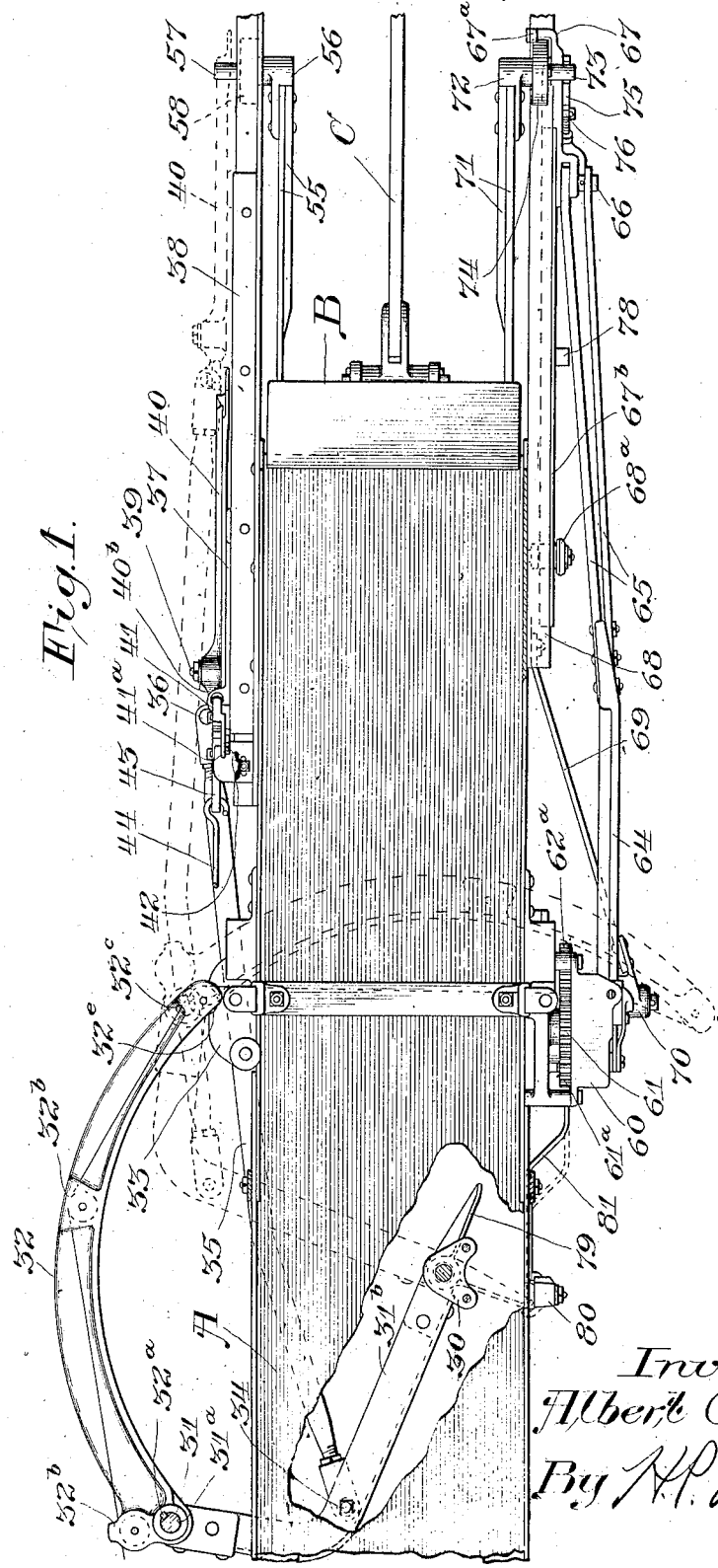

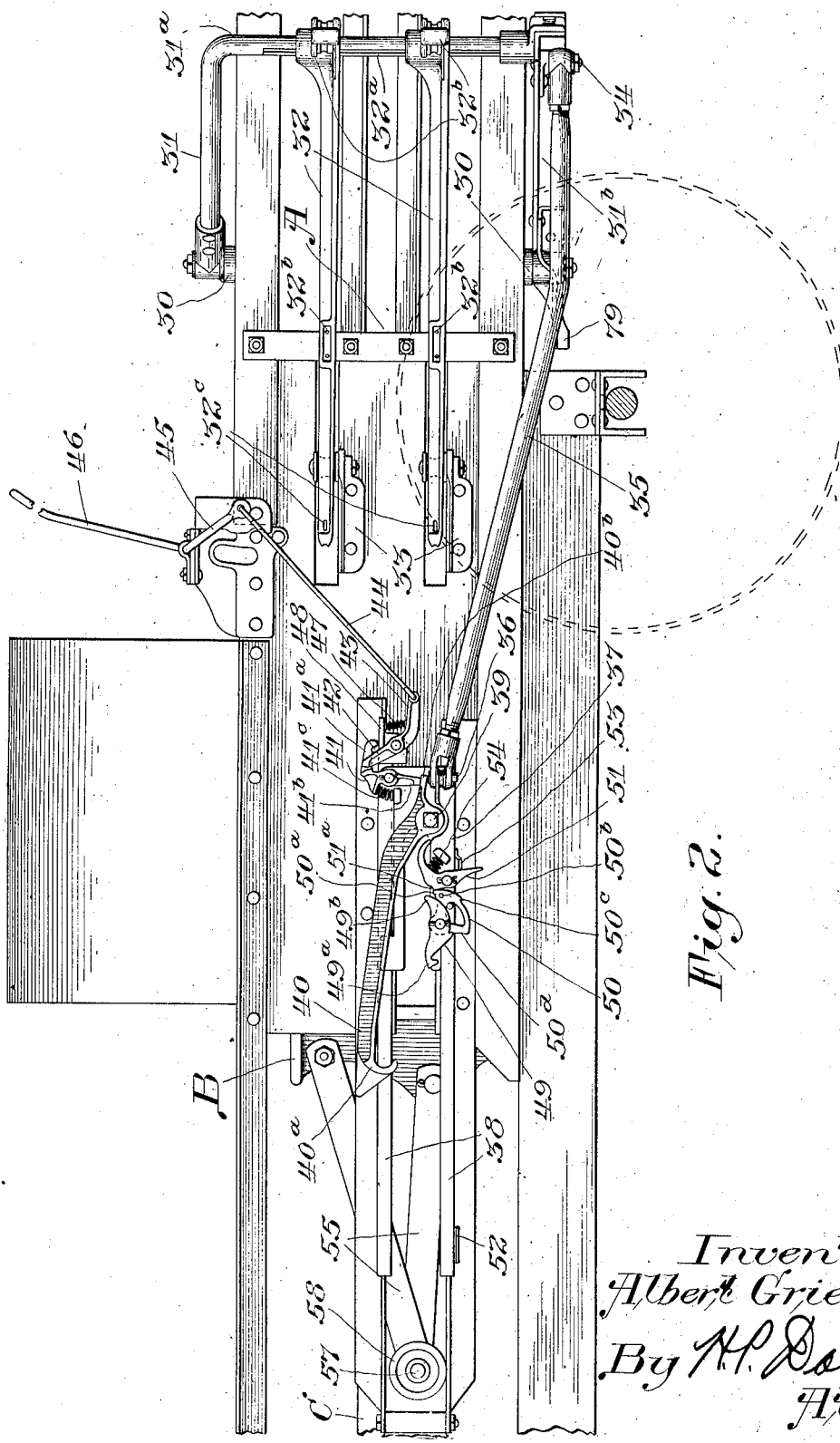

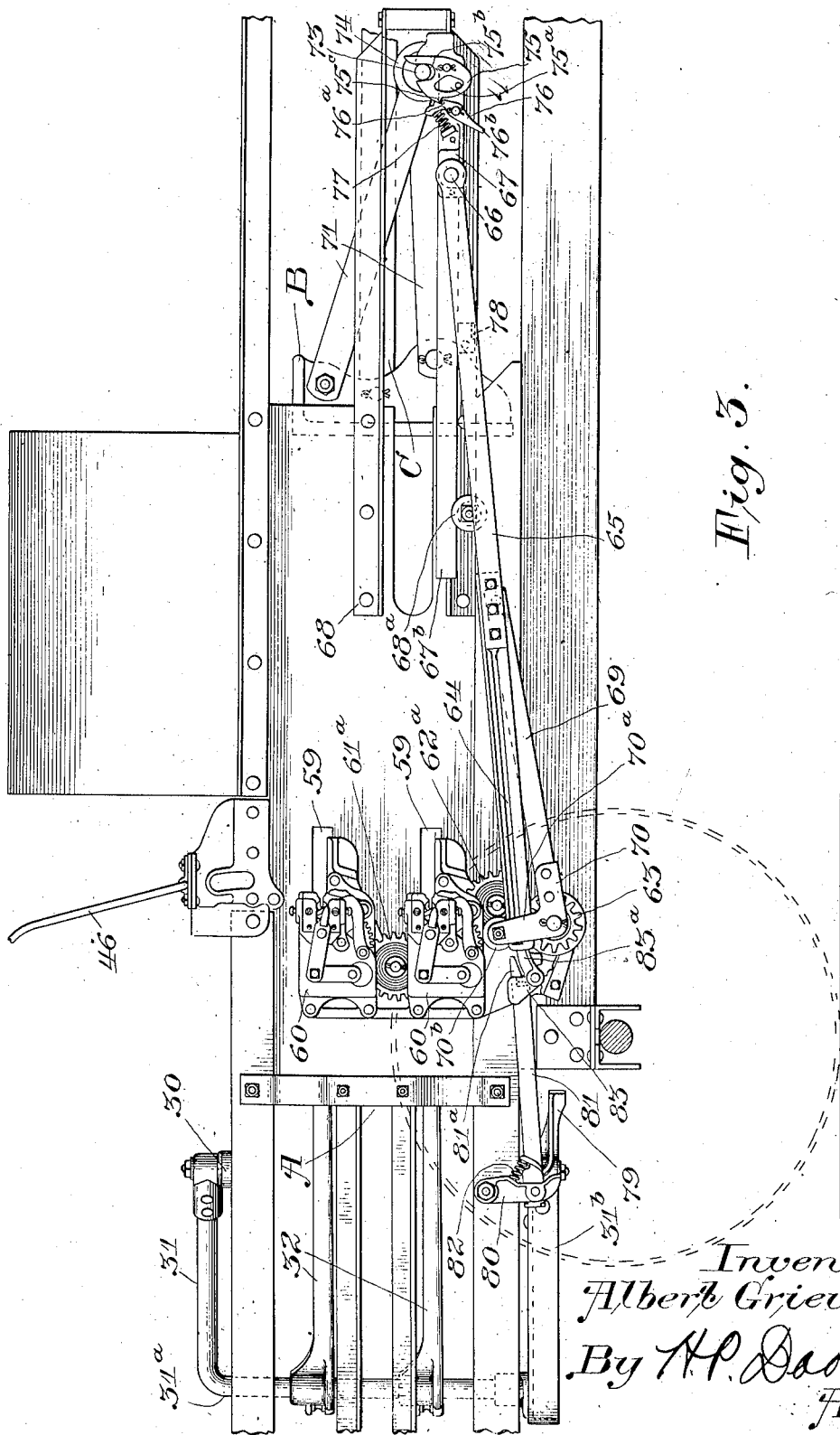

Oct. 21, 1924.                                                                      1,512,532
A. GRIEVES
TYING MECHANISM FOR BALING PRESSES
Filed July 23, 1920                 9 Sheets-Sheet 6
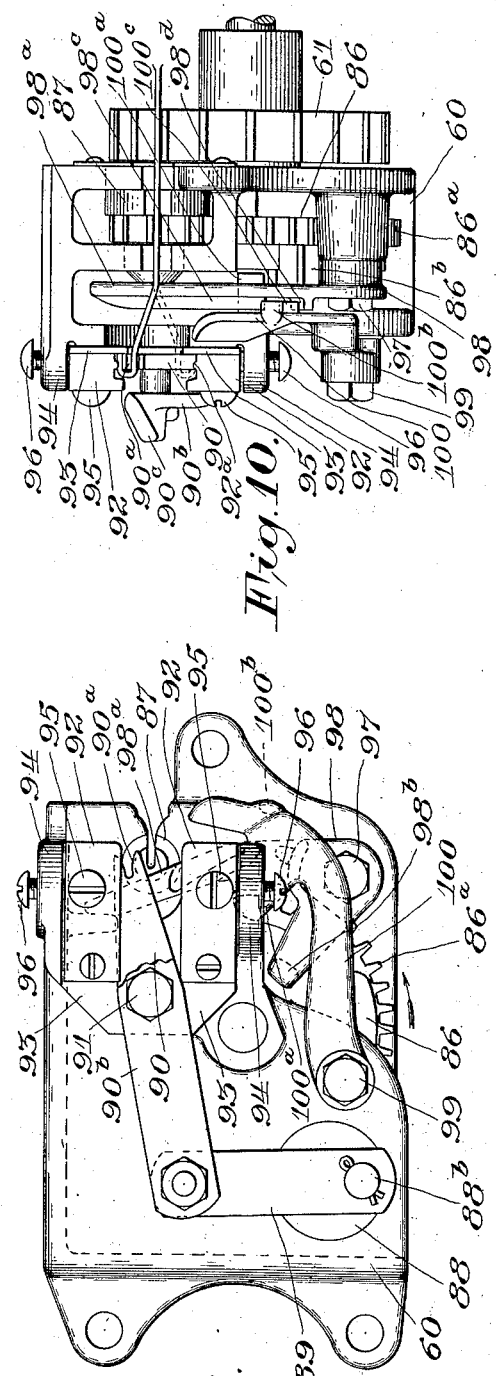
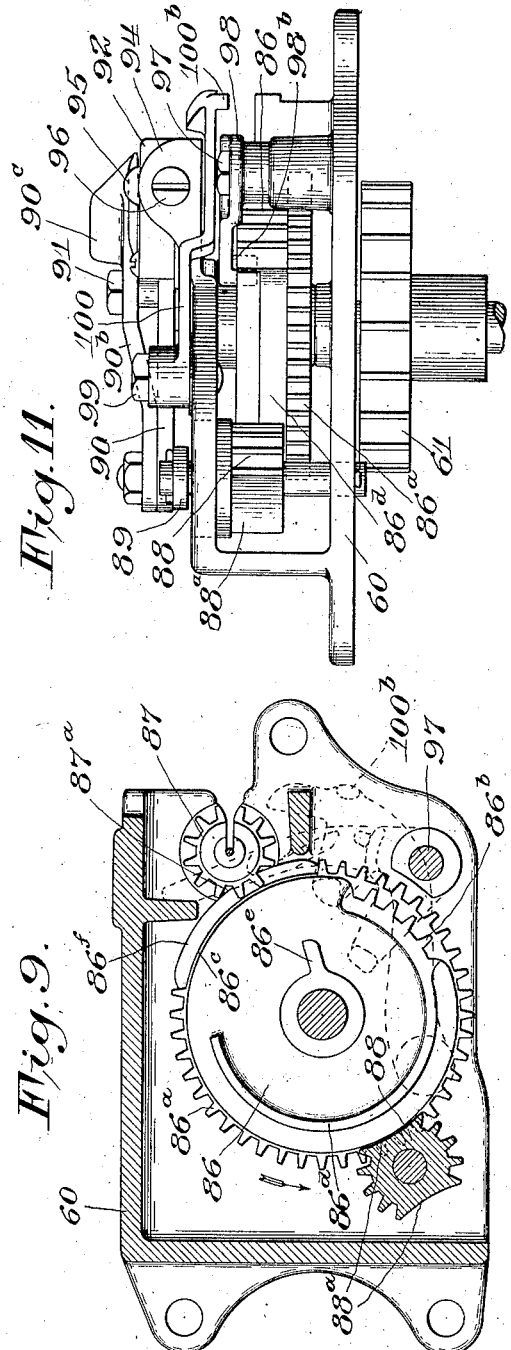
Inventor.
Albert Grieves,
By H. P. Doolittle
Atty.

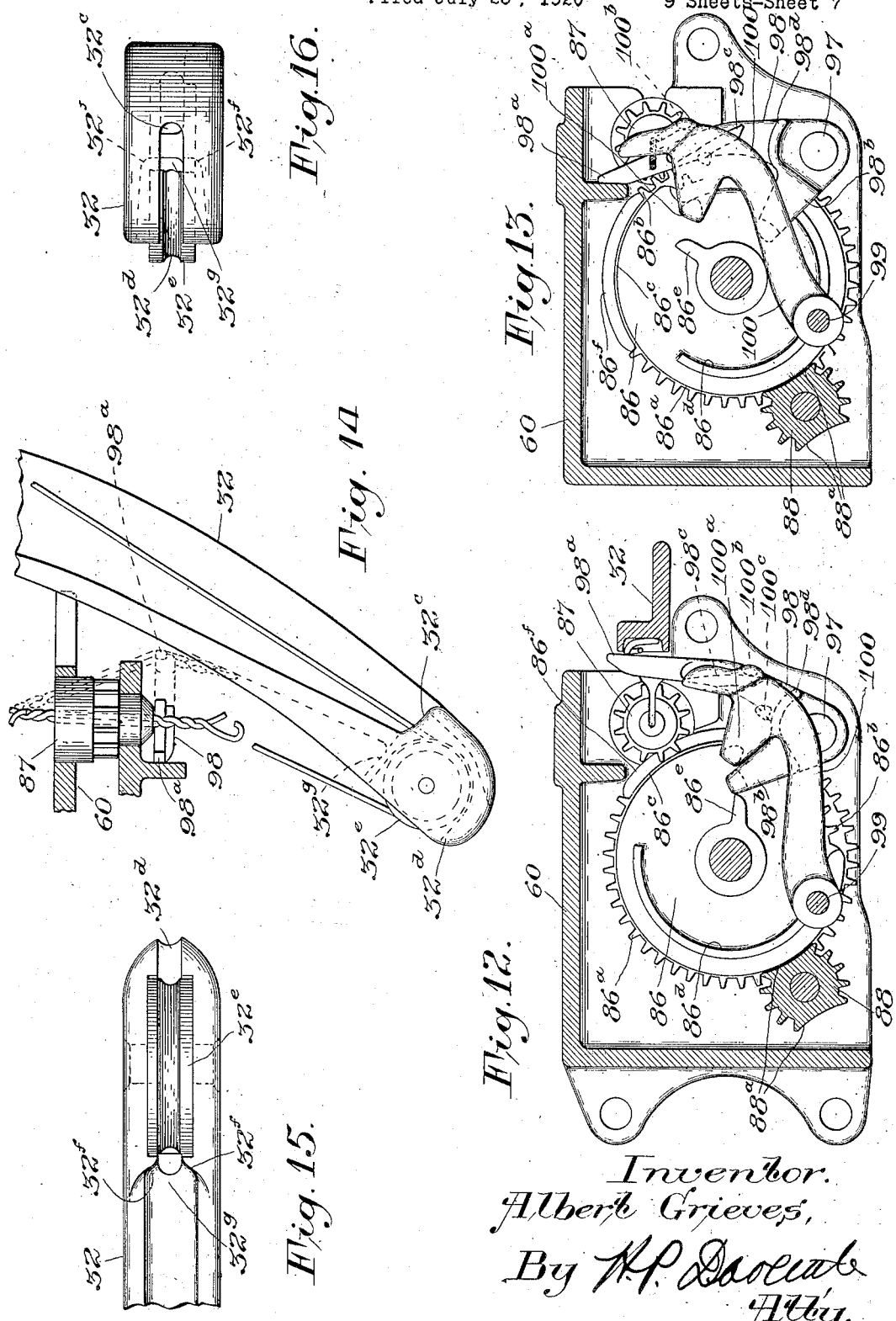

Oct. 21, 1924.  
A. GRIEVES  
1,512,532  
TYING MECHANISM FOR BALING PRESSES  
Filed July 23, 1920    9 Sheets-Sheet 8
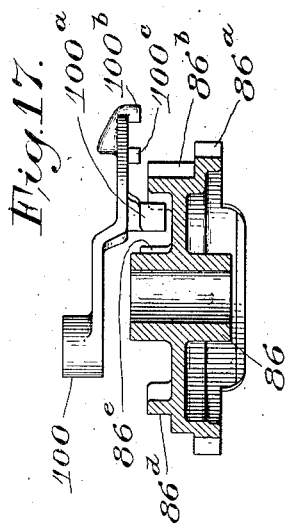
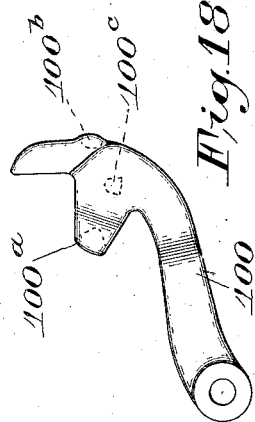
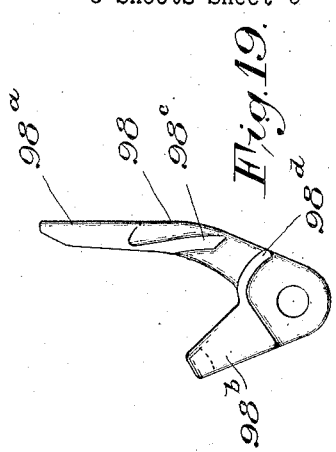
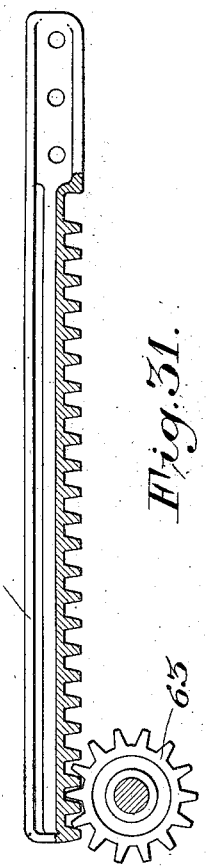
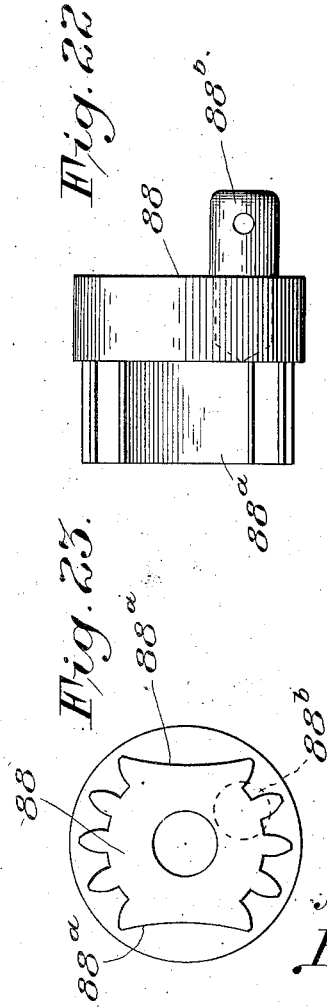
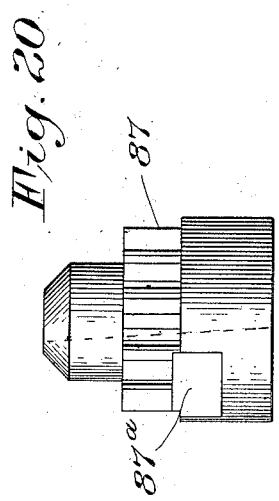
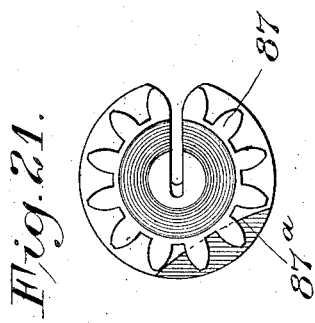
Inventor.  
Albert Grieves,  
By H. P. Doolittle  
Atty.

Oct. 21, 1924.
A. GRIEVES
1,512,532
TYING MECHANISM FOR BALING PRESSES
Filed July 23, 1920  9 Sheets-Sheet 9
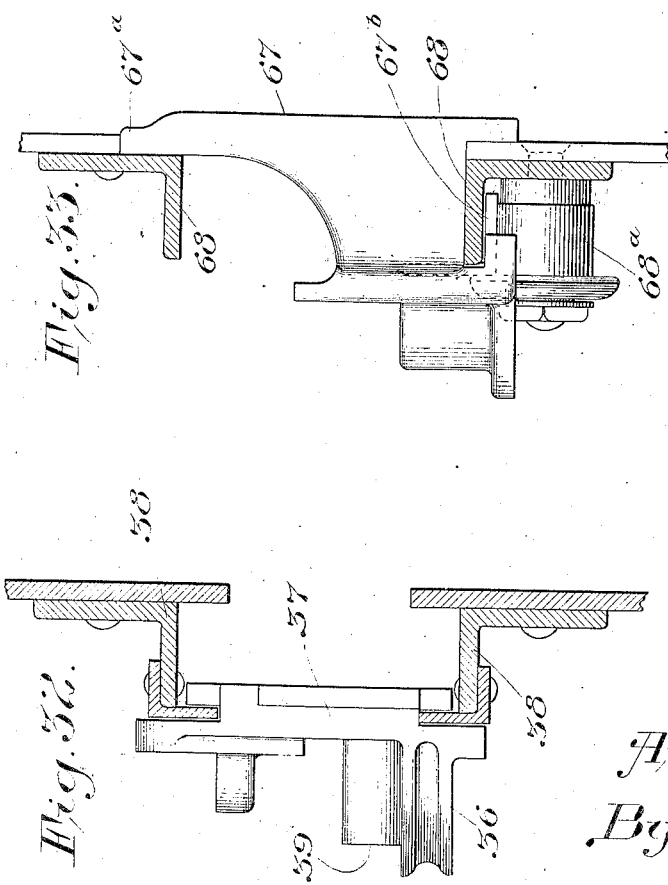
Inventor.
Albert Grieves,
By H. P. Doran
Atty.

Patented Oct. 21, 1924.

1,512,532

UNITED STATES PATENT OFFICE.

ALBERT GRIEVES, OF SPRINGFIELD, OHIO, ASSIGNOR TO INTERNATIONAL HARVESTER COMPANY, A CORPORATION OF NEW JERSEY.

TYING MECHANISM FOR BALING PRESSES.

Application filed July 23, 1920. Serial No. 398,419.

*To all whom it may concern:*

Be it known that I, ALBERT GRIEVES, a citizen of the United States, residing at Springfield, in the county of Clark and State of Ohio, have invented certain new and useful Improvements in Tying Mechanism for Baling Presses, of which the following is a full, clear, and exact specification.

My invention relates to automatic tying devices and more particularly to mechanism for binding compressed bales of hay or like material with wire and tying or twisting the wire or wires at the completion of each bale without interruption of the baling process.

The objects of my invention are to provide a bale tying device for baling presses of the plunger type that will operate smoothly and with minimum use of power and that will not interfere with the action of the baling mechanism, that can be thrown into operation at any time and that will be actuated only on retraction of the plunger. Also, to provide against binding or entanglement of the wire in the twisting mechanism and against protrusion of the joined ends of wire from the finished bale.

This has been accomplished by providing carriages slidably mounted on the baler frame including a trip controlled device by which one of the carriages is made to reciprocate once with the plunger and is then automatically disconnected therefrom, this carriage carrying means for actuating wire carrying arms which carry the binding wires across the compression chamber and into the twisting mechanisms, the other carriage then serving to drive the twisting mechanisms. Said mechanisms including means for positively ejecting the intertwisted ends of the wires and withdrawing them into the path of the plunger by which they are pressed into the bale.

With the above main and other minor objects in view, my invention consists of the organization, combinations of elements, parts or their equivalents, hereafter described and particularly defined in the claims.

Having reference to the drawings:

Fig. 1 is a plan view showing the baling chamber of a press equipped with the invention.

Fig. 2 is a view of one side of such a press.

Fig. 3 is a view of the opposite side.

Fig. 4 is an enlarged detail view of part of the mechanism seen in Fig. 2.

Fig. 5 is a similar view of mechanism seen in Fig. 3.

Fig. 8 is a face view of one of the wire twisters.

Fig. 9 is a section on a vertical transverse plane through the mechanism seen in Fig. 8.

Fig. 10 is an end view of Fig. 8, looking toward the left.

Fig. 11 is a bottom view of Fig. 8.

Figs. 12 and 13 are similar views to Fig. 9 on a different plane and showing parts at different stages of operation.

Fig. 14 is an enlarged detail of the end of a wire-carrying arm.

Fig. 15 is an edge view of the same, looking toward the right at Fig. 14.

Fig. 16 is an end view of Fig. 14.

Fig. 17 is a detail view showing two elements of the twister in position.

Fig. 18 is a detail view of one of the levers forming part of the twisters.

Fig. 19 is a detail view of another of the levers in the twisters.

Fig. 20 is a detail view of the twister pinion.

Fig. 21 is an end view looking down on Fig. 20.

Fig. 22 is a detail view of a multilated pinion controlling the wire grasping device in the twisters.

Fig. 23 is an end view of Fig. 22, looking toward the right.

Figs. 24 to 27 are face and end views of a lever for grasping and guiding the tie wires, forming part of the twister mechanisms.

Fig. 28 is a face view of knife plates employed in the twister mechanism.

Fig. 29 is a detail of a grasping die employed in connection with each knife-plate.

Fig. 30 is an end view of the knife-plates and dies when assembled.

Fig. 31 is a detail view of the driving rack and gear for the twisters, seen in Fig. 3.

Fig. 32 is an enlarged sectional detail on a transverse vertical plane through the guides on one side of the press and showing how a carriage is mounted thereon, and Fig. 33 is a similar view through the guides on the opposite side of the press and showing the opposite carriage.

Figure 7:
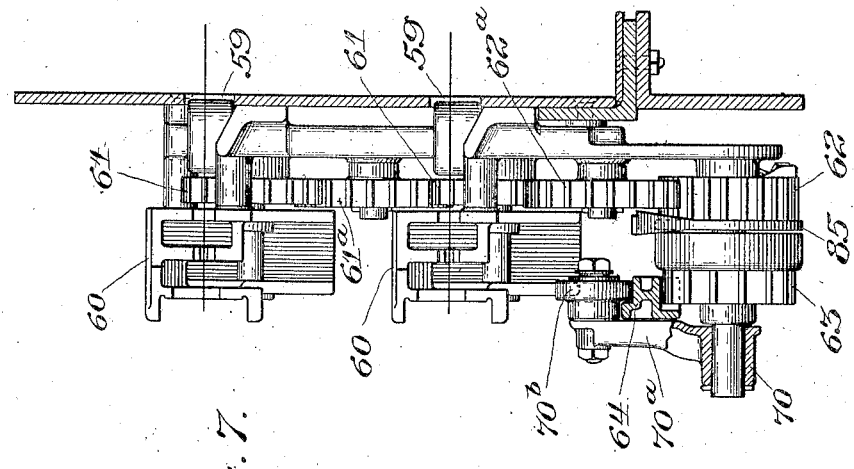
Figs. 6 and 7 are detail views in front and side elevation respectively, showing the driving mechanism for the twisters.

The parts comprising my invention are shown in connection with a baling press having the usual baling chamber A and plunger B reciprocated by pitman C from a source of power not shown. At opposite points on the top and bottom of the chamber A trunnions 30 are provided on which the horizontal arms of a swinging bail 31 are journaled. This bail is preferably formed of a member 31ª bent at right angles and forming the vertical and upper horizontal arm of the bail, and an angularly bent member 31ᵇ joined to the lower end of member 31ª and forming the lower horizontal arm of the bail. The vertical arm or portion of the bail has fixed thereto at properly spaced points, the ends of two wire carrying arms or "needles" 32 which are preferably adjustable vertically on the bail and locked against turning on their bearings by a spline, as at 32ª (Fig. 2). The arms 32 are curved on an arc approximately about the trunnions 30 and swinging of the bail carries the arms through openings in the sides of the baling chamber A and horizontally across it, the ends of the arms extending some distance beyond the opposite wall of the chamber when at their limit of movement. The arms 32 are preferably formed with a vertical and a horizontal flange and wire guides 32ᵇ are provided at the base and intermediate the length of each arm while their ends are formed with an eye 32ᶜ (Figs. 14-16) opening into a bifurcated tip 32ᵈ in which there is mounted a wire receiving pulley 32ᵉ. Inwardly of this pulley, the wings or sides of the bifurcated tip are turned in as at 32ᶠ (Fig. 15) and the vertical flange of the arm 32 is displaced toward the axis of the arm to form a tie engaging pocket 32ᵍ. Roller brackets 33 (Figs. 1 and 2) are provided to support the tie wires.

As means for swinging the bail 31 and its wire carrying arms, I employ the plunger B which is operatively connected to the bail 31 in the following manner:

Approximately at the bend in the lower member 31ᵇ of the bail 31 there is pivotally connected thereto at 34 one end of a pitman 35 which is bent to extend outwardly and upwardly, as seen in Figs. 1 and 2, to bring its other end up to that side of the baling chamber on which the bail and wire arms 32 are carried, where it is pivotally connected as at 36 to a carriage 37 slidably mounted between upper and lower guides 38 on the side of the press. On this carriage there is mounted on the horizontal pivot 39 a rearwardly extended coupling arm 40 which has its end formed into a hook 40ª while its pivot end has a forwardly projecting lug or heel 40ᵇ. Normally, the arm 40 is locked in elevated or inoperative position by a latch 41 pivoted on the carriage and formed with a forwardly extended hooked bill 41ª and a downwardly extended arm 41ᵇ.

A compression spring 41ᶜ engages a ledge on the latch and a lug on the carriage and normally presses the arm 41ᵇ of the latch towards the heel 40ᵇ, and the bill 41ª toward a lug 42 on the press frame. Pivoted intermediate its ends on the press frame just below the lug 42 there is a latch releasing lever 43 which has one end positioned to engage the upper part of latch 41 and its other end connected to a link 44, which in turn is connected to the cranked end 45 of a hand operated lever or bail 46. A spring 47 placed between a lug 48 on the press and latch lever 43 normally holds it in contact with one edge of the lug. When the arm 40 is inoperative, the lower end 41ᵇ of latch 41 is engaged with the top of heel 40ᵇ and the hooked bill 41ª engages lug 42 to retain the carriage 37 in its forward position. For the purpose of locking the carriage 37 at its rearward position, there is provided a series of interengaging pawls, 49, 50 and 51. Rear pawl 49 overlies pawl 50 and is formed with a hooked bill 49ª adapted to engage a lug 52 on the press frame and with a cam tail 49ᵇ. Pawl 50 is mounted on the same pivot as pawl 49 and has a guiding slot engaging a stud on the carriage. It also has a tail 50ª with a pin 50ᵇ projecting from its face in position to engage the lower edge of cam tail 49ᵇ and its lower edge is of arcuate form interrupted by a step 50ᶜ for co-operation with pawl 51, ending in a vertical edge 50ᵈ positioned to engage lug 52. Pawl 51 has two arms approximately at right angles and is pivoted to the carriage with one arm in substantially vertical and the other in horizontal position. The upper rear edge of the vertical arm has a tooth 51ª for co-operation with step 50ᶜ and its lower forward edge is adapted to engage a stop lug 53 on the press frame. Its horizontal arm is slightly bowed upwardly and its upper edge forms a cam track while its lower edge is engaged by a spring 54 mounted on a lug on the carriage which normally presses the horizontal arm of pawl 51 upwardly and toward pawl 50.

For the purpose of engaging arm 40 to reciprocate the carriage 37 and related mechanism, a pair of bars 55 is secured to the side of the plunger B and these converge rearwardly and are joined to a bracket 56 having a laterally extending stub shaft 57 on the inner portion of which a roller 58 is journaled. This roller rides on the lower guide or track 38 and the stub shaft 57 extends beyond the guides 38 and into the plane of the arm 40 and the series of pawls 49, 50 and 51 above described.

Operation of the mechanism so far described takes place in the following manner: When a bale has been formed and is ready to tie, the operator trips the bail or lever 46 thereby pulling upon one end of lever 43 and causing its other end to push on and release the latch 41 from lug 42 and from its position on heel 40$^b$. This permits the arm 40 to drop, bringing its hooked end 40$^a$, in the path of stub shaft 57 and the end of its heel 40$^b$ against the side of the latch 42 (Fig. 4) preventing it from returning to normal position until the arm 40 is again raised. When arm 40 is down, stub 57 can pass forwardly under hook 40$^a$, the end of arm 40 being beveled to cause it to ride over the stub, but on its return movement hook 40$^a$ will engage the stub and the carriage will be moved backward with the plunger moving with it the pitman 35 and swinging bail 31 and with it the wire feeding arms 32 so that the latter pass across the end of the bale carrying the tie wires to the twisting mechanism on the opposite side of the press. When the plunger reaches the end of its backward stroke, carriage 37 will have traveled from dotted line to full line position of Fig. 4 and the edge 50$^d$ of pawl 50 will engage one edge of lug 52 causing the pawl to swing and its pin 50$^b$ to engage the under edge of the cam tail on pawl 49 throwing its bill 49$^a$ into engagement with the other edge of lug 52, at the same time locking the pawl series together by engagement of tooth 51$^a$ on pawl 51 with step 50$^c$ on pawl 50, thereby locking carriage 37 and related mechanism to the lug 52 on the press frame. It is to be noted that in this position the cam tail 49$^b$ of pawl 49, tail 50$^a$ of pawl 50 and the cam track on the horizontal arm of pawl 51 are each in the path of movement of stub-shaft 57. On the next forward stroke of plunger B the stub 57 will leave the hook 40$^a$ and move freely under arm 40 until it strikes the tail 49$^b$ of pawl 49 causing pawl 49 to swing sufficiently to release its bill 49$^a$ from lug 52, the stub then engaging the tail 50$^a$ of pawl 50, (left end Fig. 4) which remains locked in position with pawl 51, and the carriage 37 is thereby moved forwardly until the vertical arm of pawl 51 strikes lug 53 releasing it from pawl 50 which drops and allows the stub-shaft 57 to ride over the track on the horizontal arm of pawl 51, at which time it engages an inclined under surface on arm 40 forcing this arm upwardly and lowering its heel 40$^b$ to a position where the end 41$^b$ of the latch 41 snaps back over the heel 40$^b$, its bill 41$^a$ at the same time engaging lug 42, thus again locking the carriage 37 and mechanism operated thereby in inoperative position, as indicated by the dotted lines at right end of Fig. 4.

Figure 6:
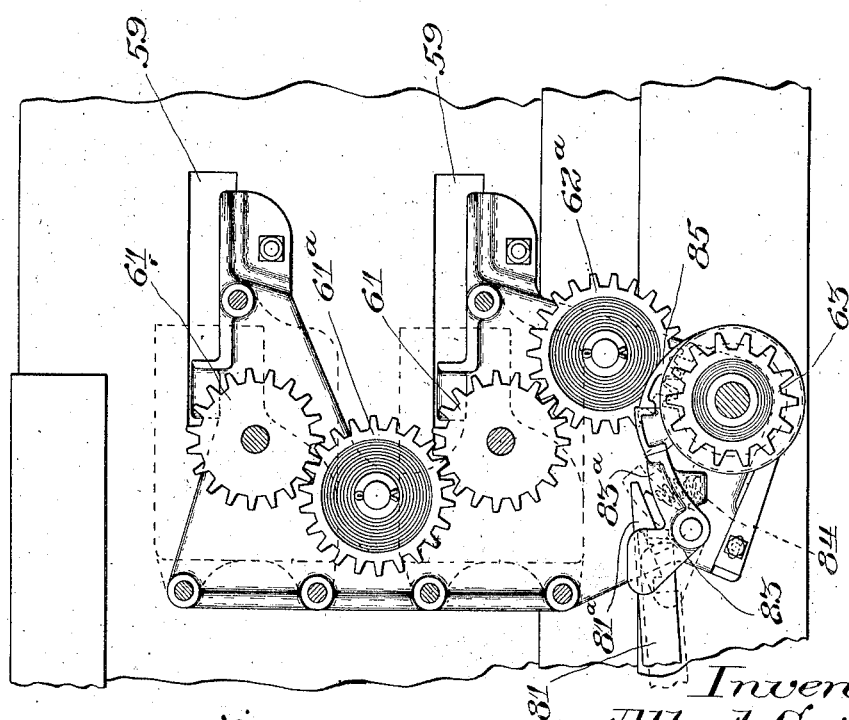

During the above described cycle of operation of the wire-arm swinging mechanism, the wire tying or twisting devices on the opposite side of the baling chamber are also actuated at the proper time and the wires brought across the bale by the arms 32 are intertwisted with the wire ends held by the twisting mechanism and the twisted ends released therefrom and bent back into the side of the bale. This is effected by the mechanism and in the manner now described. Openings 59, (Fig. 3) are provided in the side of the baling chamber for passage of ends of the wire-arms 32 and adjacent each opening brackets 60 which carry the wire twisting mechanism, are mounted in any suitable manner. Each twister includes a main drive gear 61 connected by an intermediate gear 61$^a$. These are driven from the gear wheel 62 through intermediate gear 62$^a$, the gear 62 being formed on one member of a clutch the other member of which carries the gear 63 (Figs. 6 and 7). This clutch is preferably of the pawl and ratchet type and is controlled by actuation of the wire feeding mechanism, manner to be later described, it normally being idle, with gear 63 turning idly with relation to gear 62. Gear 63 is in engagement with a reciprocating rack bar 64 carried by one end of a twin-bar pitman 65 which has its opposite end pivotally connected to a pintle 66 on a carriage 67 which is slidably mounted in upper and lower guides 68 on the side of the press and preferably formed with an upward extension 67$^a$ engaging the upper guide and a forward extension 67$^b$ engaging a roller 68$^a$ on the lower guide. A brace 69 connects the side of the press with a bearing bracket 70 in which one end of the shaft carrying clutch gears 62—63 is mounted. This bracket has an upward extension 70$^a$ (Fig. 3) which supports a roller 70$^b$ under which rack 64 moves, the roller 70$^b$ engaging a groove in the back of the rack-bar and serving to guide the bar and keep it in mesh with gear 63.

The carriage 67, like carriage 37 on the opposite side of the press, is reciprocated through connection with the plunger in the following manner: A pair of bars 71, similar to the pair 55, is connected to the opposite side of the plunger B and, in the same manner as on the other side, are joined to a bracket 72 having a laterally extending stub-shaft 73 on which a roller 74 is journalled. This roller rides on lower guide 68 and the stub-shaft extends beyond the guides and into the plane of the carriage and coupling elements carried thereby. These elements comprise a coupling pawl 75 and control pawl 76 both pivoted on carriage 67 in cooperating relation. Pawl 75 has a guide slot 75$^a$ engaging a stud on the carriage. Its forward edge is of generally arcuate form. At its upper end there is a downwardly extending notch 75$^b$ shaped to receive stub-shaft 73 and below the notch there is a step 75$^c$ in the forward edge for engagement with pawl 76. Pawl 76 is approximately straight and consists of an upper part or head 76ª and a lower depending arm 76ᵇ. One corner of the head 76ª is shaped to engage the step 75ᶜ in pawl 75 toward which it is pressed by a spring 77 engaged between a lug on the carriage and an extension on the head 76ª (Figs. 3 and 5). Assuming the parts just described to be in the position shown in full lines in Fig. 5, the stub 73, on backward stroke of the plunger, will engage the notch 75ᵇ and cause the pawl 75 to swing until the stub 73 meets a ledge 67ᶜ on carriage 67 at which time the head of pawl 76 will engage step 75ᶜ and lock pawl 75 in position. The carriage will then travel with the plunger to the end of its stroke, as in dotted lines Fig. 5, and as pawl 75 is locked, will return with the plunger until arm 76ᵇ of pawl 76 strikes a lug 78 fixed to the press. This causes pawl 76 to swing and releases pawl 75 returning it to the position shown in full lines Fig. 5, thus releasing the stub 73. This connection and disconnection of stub 73 with carriage 67 is repeated with each reciprocation of the plunger and the rack 64 is therefore reciprocated also, but moves idly with gear 63 unless this gear has been connected with gear 62 by tripping the clutch connecting them. This tripping and consequent operation of the wire tying or twisting mechanism to be described, occurs on each actuation of the wire-feeding arms 32 in the following manner:

The lower arm 31ᵇ of the bail 31 extends beyond its pivot to form a trip 79 (Figs. 1 and 3). When the bail 31 and wire-arms 32 are caused to swing, as above described, the trip 79 will swing to dotted line position Fig. 1 and there come into engagement with the depending end of a short lever 80, (Fig. 3) pivoted at its upper end to the press. A link 81 is pivotally connected to lever 80 between its ends and a spring 82 positioned between the lever 80 and a lug on link 81 presses the latter downwardly. The free end of link 81 is formed with a notched nose 81ª which is positioned between upwardly projecting ears on a trip dog 83, the notch in the nose 81ª engaging a lug between the ears. Dog 83 has a trip arm 83ª extending in the path of the projecting end of a clutch dog positioned within the clutch and which is thrown out by contact with arm 83ª, the clutch remaining free until the clutch dog is released by retraction of link 81 which swings trip 83ª upwardly, as indicated in dotted lines on Fig. 6. The clutch dog 83 immediately tends to return to normal position, under pressure of a spring 84 positioned between the press and dog, and rides on a cam track 85 formed on the clutch member adjacent gear 62 until the clutch completes a revolution and the projecting end of the clutch dog is again engaged and the clutch thrown out. The clutch used is of well known type and further description of its internal mechanism is not deemed necessary.

When the clutch is tripped, rack 64 will drive gear 62 on the return or forward stroke of the plunger and through it the train of gears 62ª—61 by which the wire tying or twisting devices are operated. Each gear 61 drives one of the wire twisters or knotters and as these are duplicates only one will be described.

The twisting or knotting mechanism comprises a main interrupted gear wheel 86 (Figs. 8 to 13) fixed to the same shaft as drive gear 61, a slotted twister pinion 87, and a mutilated pinion 88. The pinions 87 and 88 are in offset parallel planes and main gear 86 is formed with two sets of gear teeth 86ª—86ᵇ positioned to engage with the respective pinions. The teeth 86ª are formed on the periphery of the wheel 86 and extend over approximately two-thirds of its circumference, leaving a delay surface 86ᶜ. Teeth 86ᵇ are on one end of a flange 86ᵈ which is concentric with the periphery of the wheel and projects laterally therefrom below the toothed portion of its rim but terminating a little short of each end of said toothed portion. Teeth 86ᵇ are only six in number and come into mesh with the two opposite sets of five teeth on mutilated pinion 88 once for each revolution of wheel 86. The teeth on pinion 88 are separated by opposite delay surfaces 88ª and in operation each engagement of teeth 86ᵇ with pinion 88 gives it a half revolution. On the other hand, each engagement of teeth 86ª with pinion 87 imparts three revolutions thereto, following which pinion 87 is idle for the remainder of the revolution of wheel 86 owing to passage of delay surface 86ᶜ, at which time pinion 87 is locked against rotation by engagement of its arcuate locking face 87ª with a track 86ᶠ on the delay surface. The outer end of pinion 88 is journaled in bracket 60 (Fig. 8) flush with the face of the bracket and an eccentric pintle 88ᵇ is fixed thereto on which is journaled a link 89 pivotally connected to one end of the wire cutting and grasping lever 90. This lever is pivoted to the bracket at 91 and its free end is positioned between upper and lower grasping dies 92, preferably formed with wire nicking edges 92ª and secured on knife plates 93. The dies and plates are mounted between lugs 94 on bracket 60 by transverse pins or screws. The opening through the dies and plates for screws 95 are made slightly larger than these screws, and the lugs 94 carry set-screws 96 which serve to give dies 92 the slight degree of adjustment required. The free end of lever 90 is bifurcated as at 90ª for reception of the tie-wire, and a laterally spaced rigid branch 90^b of the lever has its end opposite the bifurcation and formed with an enlarged wire-guiding head 90^c. The bifurcated end of lever 90 travels across and against the edges of the knife plates having a shearing action therewith.

Pivoted within the bracket 60 at 97 is a stripper lever 98 which has a vertical arm 98^a positioned to swing across the axis of twister pinion 87 and a shorter laterally extending arm 98^b provided with a lug lying in the path of a trip 86^e on gear 86.

Pivoted to the bracket at 99 to the rear of lever 98 is a tucker lever 100. This lever swings upwardly and rearwardly in a plane parallel to that of lever 98 and close thereto and its extreme end also crosses the axis of twister pinion 87. Intermediate its ends it has a laterally extending arm 100^a which has a lug at its outer end positioned for engagement by the flange 86^d. It also has a lateral lug at 100^b which is in position to be engaged by a ledge 98^c (Figs. 12 and 19) on lever 98 to act as a stop for excessive outward swing of this lever while a second lug 100^c engages a second ledge 98^d on lever 98 and acts as a stop to excessive outward swing of lever 100.

When prepared for operation the wire-arms 32 each have a strand of wire threaded through the guides 32^b, the eye 32^c (Figs. 14 and 16) and around the pulley 32^e extending from there into the baling chamber where it passes down one side of the bale, across its end and up its other side to a twister where each wire end is being held by one of the grasping levers and dies in the manner shown in Fig. 10, the wires having been pushed back as the bale was formed.

Operation of the bale binding and wire tying mechanism above described takes place when the operator trips the lever 46 as a bale is completed, this causes engagement of arm 40 on carriage 37 with stub-shaft 57 in the manner already described with consequent swinging of the wire-carrying arms across the baling chamber to the position shown in dotted lines Fig. 1. Just as the arms 32 reach this position, the trip 79 engages the clutch tripping mechanism 80—81—83 and the clutch connects gears 62—63 for joint revolution. At this time rack 64 is drawn back to the position shown in Figs. 1 and 3. Plunger B then begins its return stroke carrying carriage 67 and rack 64 with it by reason of the coupling mechanism 75—76 above described. During the first part of the return stroke of the plunger B carriage 37 remains still and the wire arms in their swung position, owing to the fact that stub-shaft 57 travels idly from its position in the hooked end 40^a (Fig. 4), until it comes in contact with pawl 50 (dotted line position left end Fig. 4). During this interval rack 64 is driving gear 63 which, being locked to gear 62 by a one turn clutch, imparts one revolution to gear 62 and then releases. This one revolution is transmitted to the drive gears 61 and main gear 86 of each twister and tying or intertwisting of each binding wire takes place.

When the tying action starts the twister parts are in the positions shown in Figs. 8, 9 and 10 and one wire end is held in the twister as seen in Fig. 10. Just before actuation of the twister takes place, the wire-arms 32 have each brought a strand of wire across the end of the bale and in proximity to the slot in twister pinion 87 as will be understood from the dotted line position of the arm 32 in Fig. 1 and the full line position of the wire in Fig. 14. Operation of the twister then takes place, the first result of rotation of gear 86 in the direction of the arrow Fig. 9, being engagement of flange 86^d with the lug on arm 100^a of the tucker lever 100. This raises lever 100 to the position seen in Fig. 13 causing it to engage and tuck the wire carried by arm 32 into the slot in the twister pinion and across the forked end of grasping and cutting lever 90, stripper-lever 98 being held back by the wire retained in the twister. As this takes place, pinion 87 is engaged by teeth 86^a by which it is given three revolutions while the tucker 98 remains locked in position by the flange 86^d. Just as pinion 87 is completing its third revolution, stub-axle 57 again engages carriage 37 and the wire-arms begin to withdraw the wire causing it to loop over the guide-head 90^c on lever 90^b the sloping point of which guides the withdrawing loop so that the wire passes around one branch of the fork in the end of lever 90 with the return strand in the bifurcation. At the same time teeth 86^b engage one of the sets of teeth on pinion 88 giving it a half revolution and causing the bifurcated end of lever 90 to swing from one clamping die to the other. In doing so it releases the old wire and brings the strand of the new wire that has just been tied to the old one, against the edge of the opposite cutter blade just as the severed end is grasped between the opposite die and lever.

Fig. 10, where the dotted lines indicate the position of the released old wire and the full lines show the newly grasped end of the new wire, will help to illustrate the operation. Just as the cutting and grasping of the new wire is completed, the tucker arm 98 is released from the flange 86^d and the arm drops by gravity to the position in Fig. 12 after which trip-lug 86^e strikes the lug on arm 98^b of the stripper lever 98 and swings the lever outwardly across the axis of the pinion 87 thus stripping the twisted wire-ends from the twisting slot of the pinion and forcing them into the path of movement of an arm 32. During this time arms 32 are continuing to withdraw, paying out the new wires across the baling chamber as they move, but just as the protruding ends of the arms are withdrawing into the baling chamber the pocket 32⁵ (Fig. 15) engages the twisted ends of the wires which have just been forced out by the stripper lever (dotted lines Fig. 14) and bends them back into the baling chamber where the plunger forces the tied ends into the side of the bale.

The positive ejection of the intertwisted wires from the slot of the twister pinion, and their positive withdrawal into the baling chamber are regarded as important features of my device assuring efficient operation of the tying mechanism.

I claim as my invention:

1. In a baling press, the combination of means for encircling a bale with a tie wire, tying mechanism for uniting the ends of the wire, means for bending the tied ends back towards the bale, and means for pressing said ends into the bale.

2. In a baling press, the combination of means for encircling a bale with a tie wire including a wire feeding element adapted to reciprocate across the baling chamber, twisting mechanism outside the baling chamber for uniting the ends of the tie wire, and means connected with the feeding element for bending the twisted ends back into the baling chamber.

3. In a baling press, the combination of means for encircling a bale with a tie wire, means including a radially slotted rotary element for intertwisting the ends of the wire, and means for positively ejecting the twisted ends from the slot including an element movable across the axis of the rotary element.

4. In a baling press, the combination of means for encircling a bale with a tie wire, means for intertwisting the ends of the wire, means for positively ejecting the twisted ends from the twisting means and means for bending the twisted ends back towards the bale.

5. In a baling press, the combination of means for encircling a bale with a tie wire including a wire feeding element adapted to reciprocate across the baling chamber, means outside the baling chamber for intertwisting the ends of the wire, means for positively ejecting the twisted ends from the twisting means, and means connected with the feeding element for bending the twisted ends back into the baling chamber.

6. In a baling press, the combination of means for encircling a bale with a tie wire including a wire feeding element adapted to travel across the baling chamber, means outside the chamber for intertwisting the ends of the wire, means for positively ejecting the twisted ends from the twisting mechanism and an engaging means on the feeding element adapted to catch and bend back the tied ends of the wire upon withdrawal of the feeding element.

7. In wire tying mechanism for baling presses, the combination with wire-tying means, of wire grasping and cutting means including an oscillating grasping lever and a fixed blade and die with which the lever co-operates to sever and grip the wire.

8. In wire-tying mechanism for baling presses, the combination with wire-tying means, of wire grasping and cutting means including an oscillating grasping lever, and opposed dies and cutting blades between which the grasping end of the lever moves and with which it co-operates alternately to sever and grip the wire.

9. In wire-tying mechanism for baling presses, the combination with wire-tying means, of wire grasping and cutting means, including an oscillating grasping lever, provided with a forked grasping end and a wire guiding head adjacent the forked end, and opposed dies and cutting blades between which the grasping end of the lever moves, each branch of its forked end being adapted to co-operate with one of the dies and blades.

10. In wire-tying mechanism for baling presses, the combination with wire-tying means, of wire grasping and cutting means, including an oscillating grasping lever provided with a wire guiding head adjacent its grasping end, and a fixed blade and die with which the lever co-operates to sever and grip the wire.

11. In wire-tying mechanism for baling presses, the combination of a slotted twister-pinion, a tucker adapted to seat and retain a tie wire in the twister slot, a wire cutting and grasping device, a stripper adapted to eject the tie from the twister slot, and an actuating element common to all said devices.

12. In a baling press, the combination of means for encircling a bale with a tie wire including a wire feeding element adapted to reciprocate across the baling chamber, means for intertwisting the ends of the tie wire comprising a radially slotted rotary element, means for forcing the twisted ends radially outward from the slot and into the path of said wire carrying element, and means on the wire carrying element for engaging and bending back said twisted ends.

13. In a baling press, the combination with the baling chamber of a horizontally swinging wire feeding element adapted to carry a tie wire across the baling chamber, wire tying mechanism at one side of the chamber to which the wire is fed by said swinging element, a single cycle clutch for actuating said tying mechanism and a trip movable with the wire feeding element for controlling the clutch.

14. In a baling press having a reciprocating plunger, the combination of means for encircling a bale with a tie wire including a wire feeding element adapted to reciprocate across the baling chamber, a wire-tying device with which said element co-operates, a single cycle clutch controlling the wire-tying device, means for initiating movement of the wire feeding element by coupling it to the plunger during retraction thereof, means actuated by the feeding element for throwing in the clutch when said element has moved across the baling chamber in one direction, clutch driving means actuated by the plunger during the first part of its return stroke, and means for completing the movement of the feeding element and for automatically uncoupling it from the plunger during the latter part of the return stroke of the plunger.

In testimony whereof I affix my signature.

ALBERT GRIEVES.